United States Patent
McGowan et al.

(10) Patent No.: US 10,035,421 B2
(45) Date of Patent: Jul. 31, 2018

(54) EDDY CURRENT BRAKING DEVICE FOR LINEAR SYSTEMS

(71) Applicants: John Lewis McGowan, Boulder, CO (US); Steven K. Holmes, Golden, CO (US)

(72) Inventors: John Lewis McGowan, Boulder, CO (US); Steven K. Holmes, Golden, CO (US)

(73) Assignee: HI TECH LLC, Boulder, CO (US)

( * ) Notice: Subject to any disclaimer, the term of this patent is extended or adjusted under 35 U.S.C. 154(b) by 170 days.

(21) Appl. No.: 14/831,310

(22) Filed: Aug. 20, 2015

(65) Prior Publication Data

US 2016/0052400 A1    Feb. 25, 2016

Related U.S. Application Data (60) Provisional application No. 62/039,731, filed on Aug. 20, 2014.

(51) Int. Cl.
| | |
|---|---|
| *B60L 7/28* | (2006.01) |
| *B60T 7/12* | (2006.01) |
| *B61B 3/00* | (2006.01) |
| *B61H 7/08* | (2006.01) |
| *H02K 49/04* | (2006.01) |
| *B60T 13/74* | (2006.01) |

(Continued)

(52) U.S. Cl.
CPC ............... *B60L 7/28* (2013.01); *B60T 7/128* (2013.01); *B60T 13/748* (2013.01); *B61B 3/00* (2013.01); *B61H 7/083* (2013.01); *F16D 63/002* (2013.01); *F16D 63/008* (2013.01); *H02K 49/046* (2013.01); *A62B 1/08* (2013.01); *H02K 2213/09* (2013.01); *Y02T 10/641* (2013.01)

(58) Field of Classification Search
CPC .. B61B 7/00; B61B 9/00; B61B 11/00; A63G 21/22; B60L 7/00; B60L 7/20; B60L 7/22; B60L 7/24; B60L 7/28
See application file for complete search history.

(56) References Cited

U.S. PATENT DOCUMENTS

| | | | |
|---|---|---|---|
| 2,122,315 | A | 6/1938 | Fosty et al. |
| 3,447,006 | A | 5/1969 | Bair |
| 3,721,394 | A | 3/1973 | Reiser |

(Continued)

FOREIGN PATENT DOCUMENTS

| | | |
|---|---|---|
| AU | 2010221817 | 10/2011 |
| CA | 2789535 | 9/2010 |

(Continued)

OTHER PUBLICATIONS

PCT Partial Search Report in International Application PCT/US2015/046171, dated Dec. 9, 2015, 8 pgs.

(Continued)

*Primary Examiner* — Robert J McCarry, Jr.

(57) ABSTRACT

An apparatus has a first truck that includes a frame. A roller is rotatably attached to the frame and a lever arm is pivotably connected to the frame. The lever arm includes a load point, a magnet, and a non-ferrous conductive material. A biasing element biases the lever arm into a first angular position. A load applied to the load point drives the lever arm against a biasing force of the biasing element, and towards a second angular position.

22 Claims, 11 Drawing Sheets

(51) Int. Cl.
*F16D 63/00* (2006.01)
*A62B 1/08* (2006.01)

(56) References Cited

U.S. PATENT DOCUMENTS

| | | | |
|---|---|---|---|
| 3,723,795 | A | 3/1973 | Baermann |
| 3,759,190 | A | 9/1973 | Harvey |
| 4,416,430 | A | 11/1983 | Totten |
| 4,434,971 | A | 3/1984 | Cordrey |
| 4,545,575 | A | 10/1985 | Forjot |
| 4,567,963 | A | 2/1986 | Sugimoto |
| 4,938,435 | A | 7/1990 | Varner et al. |
| 5,254,061 | A | 10/1993 | Leask |
| 5,429,319 | A | 7/1995 | Bogucki-Land et al. |
| 5,692,693 | A | 12/1997 | Yamaguchi |
| 5,711,404 | A | 1/1998 | Lee |
| 5,722,612 | A | 3/1998 | Feathers |
| 6,086,005 | A | 7/2000 | Kobayashi et al. |
| 6,286,637 | B1 | 9/2001 | Park |
| 6,293,376 | B1 | 9/2001 | Pribonic |
| 6,360,669 | B1 | 3/2002 | Albrich |
| 6,561,451 | B1 | 5/2003 | Steinich |
| 6,640,727 | B2 | 11/2003 | Ostrobrod |
| 6,793,203 | B2 | 9/2004 | Heinrichs et al. |
| 6,810,818 | B2 | 11/2004 | Petzl et al. |
| 6,962,235 | B2 | 11/2005 | Leon |
| 7,011,607 | B2 | 3/2006 | Kolda et al. |
| 7,513,334 | B2 | 4/2009 | Calver |
| 7,528,514 | B2 | 5/2009 | Cruz et al. |
| 7,966,941 | B1 * | 6/2011 | Brannan ............... A63G 21/22 104/112 |
| 8,424,460 | B2 | 4/2013 | Lerner et al. |
| 8,490,751 | B2 | 7/2013 | Allington et al. |
| 8,567,561 | B2 | 10/2013 | Strasser et al. |
| 8,601,951 | B2 | 12/2013 | Lerner |
| 8,851,235 | B2 | 10/2014 | Allington et al. |
| 9,016,435 | B2 | 4/2015 | Allington et al. |
| 9,033,115 | B2 | 5/2015 | Lerner |
| 2002/0179372 | A1 | 12/2002 | Schreiber et al. |
| 2003/0189380 | A1 | 10/2003 | Ishikawa |
| 2004/0074715 | A1 | 4/2004 | Johansson et al. |
| 2004/0168855 | A1 | 9/2004 | Leon |
| 2006/0243545 | A1 * | 11/2006 | Chen ....................... B60T 1/10 188/164 |
| 2006/0278478 | A1 | 12/2006 | Pribonic et al. |
| 2007/0228202 | A1 | 10/2007 | Scharf et al. |
| 2007/0298935 | A1 | 12/2007 | Badarneh et al. |
| 2008/0105503 | A1 | 5/2008 | Pribonic |
| 2009/0026303 | A1 | 1/2009 | Schmitz et al. |
| 2009/0166459 | A1 | 7/2009 | Niitsuma et al. |
| 2009/0178887 | A1 | 7/2009 | Reeves et al. |
| 2009/0211846 | A1 | 8/2009 | Taylor |
| 2010/0065373 | A1 | 3/2010 | Stone et al. |
| 2010/0211239 | A1 | 8/2010 | Christensen et al. |
| 2011/0147125 | A1 | 6/2011 | Blomberg |
| 2011/0313607 | A1 | 12/2011 | Checketts |
| 2012/0055740 | A1 | 3/2012 | Allington et al. |
| 2013/0186721 | A1 | 7/2013 | Bogdanowicz et al. |
| 2013/0216351 | A1 | 8/2013 | Griffin |
| 2014/0375158 | A1 | 12/2014 | Allington et al. |
| 2015/0196820 | A1 | 7/2015 | Allington et al. |
| 2016/0052401 | A1 | 2/2016 | McGowan et al. |
| 2017/0274261 | A1 | 9/2017 | Allington et al. |

FOREIGN PATENT DOCUMENTS

| | | |
|---|---|---|
| CN | 102428633 | 4/2012 |
| CN | 106100285 | 11/2016 |
| DE | 674761 C | 4/1939 |
| DE | 9300966 | 3/1993 |
| DE | 102005032694 | 1/2007 |
| DE | 102007022883 | 12/2008 |
| EP | 84140 | 7/1983 |
| EP | 2406872 | 1/2012 |
| GB | 1593348 | 7/1981 |
| GB | 2352644 | 2/2001 |
| GB | 2352645 | 2/2001 |
| JP | S62247753 | 10/1987 |
| JP | 10098868 | 4/1998 |
| JP | 11315662 | 11/1999 |
| JP | 2000-316272 | 11/2000 |
| JP | 2001-17041 | 1/2001 |
| JP | 2011200002 A | 10/2011 |
| JP | 2012520655 | 9/2012 |
| JP | 2015122952 | 7/2015 |
| NZ | 575464 | 7/2010 |
| WO | WO 95/16496 | 6/1995 |
| WO | 20100108484 A1 | 9/2010 |
| WO | WO 2010104405 | 9/2010 |

OTHER PUBLICATIONS

PCT International Search Report and Written Opinion in International Application PCT/US2015/046172, dated Dec. 9, 2015, 15 pgs.
PCT International Search Report and Written Opinion in International Application PCT/US2015/046171, dated Feb. 26, 2016, 21 pgs.
Climbing Wall Descent Controllers—Instruction Manual v3, Aug. 18, 2008, pp. 1-20.
TruBlue Auto Belay User Manual, Model TB150-12C, 27 pages.
PCT International Search Report and Written Opinion in Application PCT-NZ2010/00011, dated Feb. 23, 2011, 11 pages.
MSA, The Safety Company, Stop Use Notice for Redpoint and Auto-Belay Descenders, dated Oct. 14, 2009, 1 page.

* cited by examiner

EDDY CURRENT BRAKING DEVICE FOR LINEAR SYSTEMS

CROSS-REFERENCE TO RELATED APPLICATIONS

This application claims priority to and the benefit of U.S. Provisional Patent Application No. 62/039,731, filed Aug. 20, 2014, the disclosure of which is hereby incorporated by reference herein in its entirety.

INTRODUCTION

Eddy current braking systems may use centrifugal force to cause rotors to expand into a magnetic field. Centrifugal eddy current devices require significant support structure in the rotating rotor assembly to support the centrifugally deploying electrically conductive members, and to ensure that they remain in plane during deployment so that they don't make contact with magnets. Because of the complexity, structure, part count, and mass of incorporating the biasing mechanism(s) into a rotating assembly in which the electrically conductive members deploy centrifugally, the systems contain a significant amount of rotational inertia. Because of this, the initiation of eddy-current braking can be delayed during deployment, and/or completion of braking can be delayed once the load motion has ceased. Furthermore, this delay is intrinsic to the design and cannot be controlled or adjusted without redesigning the unit.

Even with such extensive support structure, such devices still require very exacting tolerances to allow the peripherally mounted conductive members to reliably move on the same plane into the magnetic field. If a conductive member's pivot is out of tolerance even by very slight amounts (something that can occur due to material defect or if a device has been dropped or suffered an impact) the conductive member can make contact with a magnet during braking, thereby damaging the device and preventing correct rotor deployment.

Heat dissipation is also an issue. Because eddy current braking systems convert kinetic (e.g., rotational) energy into heat, effectively removing the heat before the various components of the braking system are damaged is a design criteria. Centrifugal devices rely on smooth sided, low-friction conductive members to centrifugally deploy into the magnetic field while sliding against a constraining structure. Because of this, conductive member heat dissipation (an important factor in eddy current braking) is extremely limited.

For eddy current braking systems that include a retraction spring, such as self-retracting lifelines, auto belay devices and recreational self-retracting descent devices, a device with a heavier rotor assembly retracts more slowly and requires a larger and more robust retraction spring to perform the same work. Because of the limitations of acceptable device size, a larger retraction spring may not be an option, resulting in a device that cannot handle high cyclic usage (e.g., the retraction spring fatigues and fails rapidly).

Centrifugal eddy current devices often include multiple biasing elements, one for each deploying rotor. This both increases the complexity of the device and makes bias adjustment more difficult. Indeed, most centrifugal systems are not provided with adjustable biasing which would allow a device to be used in different applications. Rather, centrifugal systems are provided with a manufacturer-selected fixed bias that is determined based on the average load conditions expected for the end-use of the device. In addition, the sheer complexity of the centrifugal design contributes to a high manufacturing cost and a high servicing cost.

SUMMARY

The eddy current braking systems described herein utilize a non-ferrous conductor and a magnet that generates a magnetic field. A direct mechanical linkage (e.g., a lever arm or arm) is activated by an applied load to move the conductor closer to the magnetic field (either by moving the conductor, moving the magnet or both). Through the mechanical linkage, the amount of load applied dictates the distance between the conductor and magnet, thereby causing the braking force to vary with the applied load. The applied load causes movement of the device along a linear magnetic field to generate the braking force.

In one aspect, the technology relates to an apparatus having: a first truck including: a frame and at least one roller rotatably attached to the frame; a lever arm pivotably connected to the frame, wherein the lever arm includes a load point and at least one of a magnet and a non-ferrous conductive material; and a biasing element for biasing the lever arm into a first angular position, wherein a load applied to the load point drives the lever arm against a biasing force of the biasing element, and towards a second angular position. In an embodiment, the apparatus further includes an axle connecting the lever arm to the frame, wherein the at least one roller is rotatably disposed around the axle. In another embodiment, the biasing element includes a compression spring disposed between the frame and the lever arm. In yet another embodiment, the apparatus further includes an axle connecting the lever arm to the frame, wherein the biasing element includes a torsion spring disposed about the axle. In still another embodiment, the apparatus further has an axle connecting the lever arm to the frame, wherein the at least one roller includes two rollers separated by a line, wherein the axle is disposed substantially at a midpoint of, and offset from, the line.

In another embodiment of the above aspect, the lever arm includes a first end and a second end, wherein the at least one of the magnet and the non-ferrous material is disposed proximate the first end. In an embodiment, the load point is disposed proximate the second end. In another embodiment, a second truck includes: a frame and at least one roller rotatably attached to the frame; a lever arm pivotably connected to the frame, wherein the lever arm includes a load point and at least one of a magnet and a non-ferrous conductive material; and a biasing element for biasing the lever arm into a first angular position, wherein a load applied to the load point drives the lever arm against a biasing force of the biasing element, and towards a second angular position, wherein the second truck is substantially a mirror image of the first truck wherein the first truck is connected to the second truck proximate the load points of the first truck and the second truck. In another embodiment the biasing element of the first truck and the biasing element of the second truck are a single biasing element.

In another aspect, the technology relates to an apparatus having: a first truck including: a frame; at least one roller rotatably connected to the frame; at least one of a magnet and a non-ferrous conductive material movably displaceable from a first position relative to the truck to a second positon relative to the truck, wherein the at least one of the magnet and the non-ferrous conductive material is movable towards the second position based on an application of a load; and a biasing element for biasing the at least one of the magnet and the non-ferrous conductive material towards the first position. In an embodiment, the apparatus further has an arm engaged with the frame, wherein the at least one of the magnet and the non-ferrous conductive material is connected to the arm, wherein the biasing element is engaged with both the frame and the arm, wherein the load is applied to the arm. In another embodiment, the arm is slidably engaged with the frame. In yet another embodiment, the at least one roller is rotatably connected to the frame with an axle, wherein the axle at least partially guides sliding of the arm. In still another embodiment, the biasing element includes at least one of a compression spring and an extension spring.

In another embodiment of the above aspect, the at least one roller includes two rollers, wherein the arm is disposed substantially between the rollers. In an embodiment, the apparatus further includes: a second truck including: a frame; at least one roller rotatably connected to the frame; at least one of a magnet and a non-ferrous conductive material movably displaceable from a first position relative to the truck to a second positon relative to the truck, wherein the at least one of the magnet and the non-ferrous conductive material is movable towards the second position based on an application of a load; a biasing element for biasing the at least one of the magnet and the non-ferrous conductive material towards the first position; and an arm engaged with the frame, wherein the at least one of the magnet and the non-ferrous material is connected to the arm, wherein the biasing element is engaged with both the frame and the arm, wherein the load is applied to the arm, wherein the second truck is substantially a mirror image of the first truck wherein the first truck is connected to the second truck via the arms of the first truck and the second truck.

In another aspect, the technology relates to a system having: a conveyance structure including a first end and a second end; a plurality of braking elements configured to generate a magnetic field and disposed along the conveyance structure between the first end and the second end, wherein the plurality of braking elements are arranged so as to vary a braking force formed by the plurality of braking elements between the first end and the second end; and a truck movably engaged with the conveyance structure. In an embodiment, the plurality of braking elements are arranged such that a density of the magnetic field varies from the first and the second end. In another embodiment, the plurality of braking elements are arranged such that a density of the plurality of braking elements per unit length of conveyance structure increases from the first end to the second end. In yet another embodiment, the plurality of braking elements are arranged such that the plurality of the braking elements increase in size from the first end to the second end. In another embodiment, the conveyance structure includes an upper surface and a lower surface, and wherein the plurality of braking elements generate a weaker magnetic field proximate the upper surface and a stronger magnetic field proximate the lower surface. In another embodiment, the weaker magnetic field is generated by a magnet having a first area and the stronger magnetic field is generated by a magnet having a second area larger than the first area.

BRIEF DESCRIPTION OF THE DRAWINGS

There are shown in the drawings, examples which are presently preferred, it being understood, however, that the technology is not limited to the precise arrangements and instrumentalities shown.

DETAILED DESCRIPTION

Figure 1:
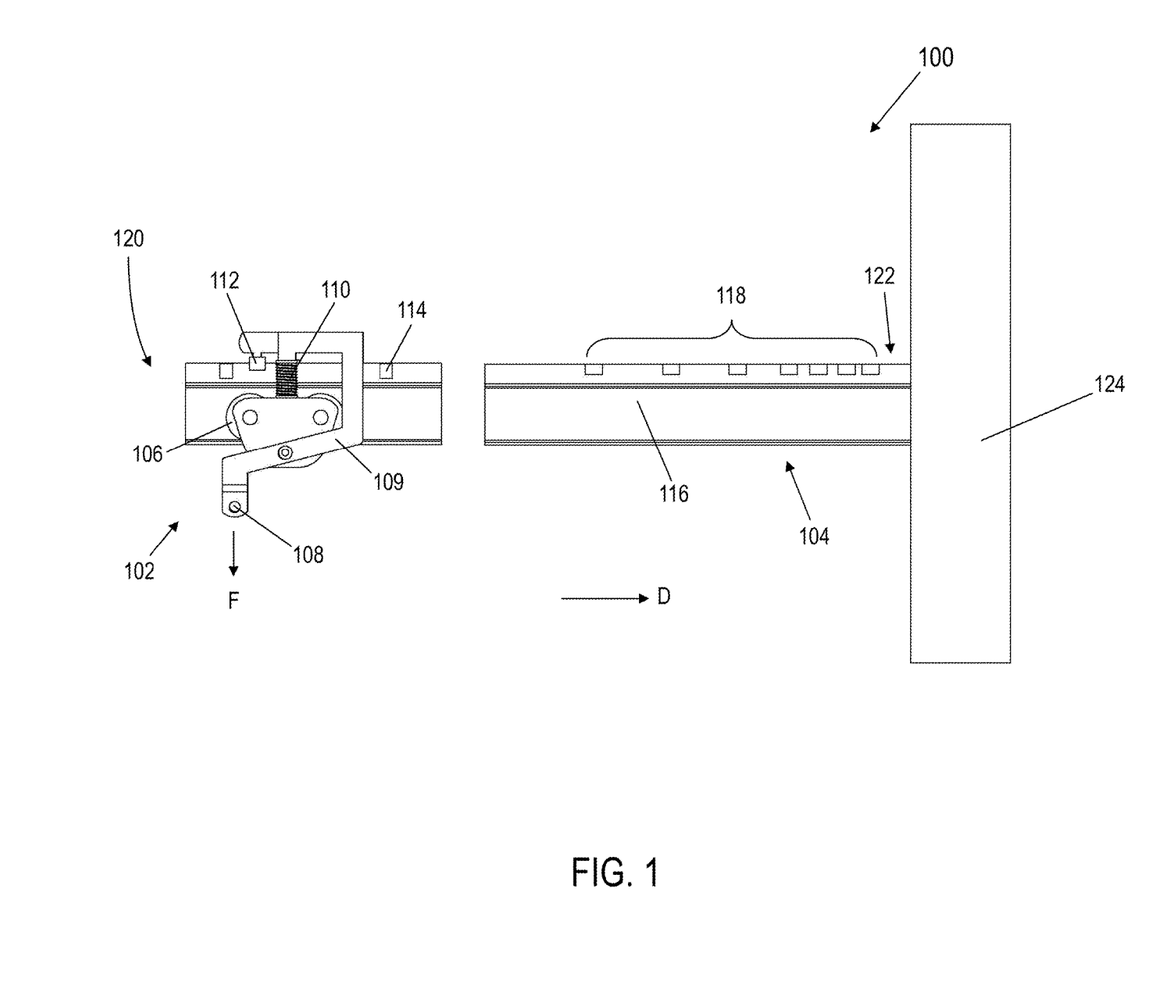
FIG. 1 depicts a side view of an eddy current braking system in accordance with an example of the technology.

FIG. 1 depicts a side view of an eddy current braking system 100 in accordance with an example of the technology. The system 100 includes a trolley 102 that moves along a conveyance structure 104, in a primary direction of travel D. Structural details of a number of trolleys and associated conveyance structures are described below. In relevant part, however, the trolley 102 moves along the conveyance structure 104 on one or more rollers 106 or other low-friction elements such as bearings, wheels, shoes, etc. The trolley 102 may be loaded at a load point 108 of a mechanical linkage 109, where a force F is applied to the trolley 102. The force F is generally provided by the weight of an item or person carried by the trolley 102. For example, the force F may be applied by the weight of a person supported by the trolley 102 (e.g., if the trolley 102 is used in a zip-line activity). The force F may also be applied by the weight of a load of (e.g., goods moved by the trolley 102) from a load station (e.g., cargo being removed from a shipping vessel) to an unload station (e.g., a storage location on a dock). In another example, the force F may be the weight of a car that rides above or below the conveyance structure 104 (e.g., a roller coaster car). Vertical configurations (e.g., for elevator systems) are also contemplated.

The force F compresses a biasing element 110 such as a spring, which causes a trolley braking element 112 to move relative to the trolley 102. The trolley braking element 112 may be a magnet or a non-ferrous conductor configured to engage with a corresponding structure braking element (depicted generally by a plurality of squares 114 on a rail 116 of the conveyance structure 104). The structure braking element may also be the other of a magnet or a non-ferrous conductor. Other types of conveyance structures 104, e.g., cables, may also be utilized. Several configurations of braking systems are contemplated. For example, both the trolley braking element 112 and the structure braking elements 114 may be magnets. Alternatively, the trolley braking element 112 may be a magnet and the structure braking elements 114 may be conductors. In another example, the trolley braking element 112 may be a conductor and the structure braking elements 114 may be magnets. Still other examples contemplate the trolley braking element 112 as a magnet, with the structure braking elements 114 as a combination of magnets and conductors, as required or desired for a particular application. Regardless, in the following description, the trolley braking element 112 is referred to as a conductor, while the structure braking elements 114 are referred to as magnets, for clarity. Additionally, the trolley braking element 112 is generally referred to in the singular, while structure braking elements 114 are generally referred to in the plural. Multiple trolley braking elements 112 may also be utilized.

A higher load on the mechanical linkage 109 creates a higher force F, thus moving the trolley braking element 112 closer to the structure braking elements 114. Thus, in the example where the trolley braking element 112 is a conductor and the structure braking elements 114 are magnets (electromagnets, permanent magnets, or otherwise), the conductor 112 is moved farther into the magnetic field generated by the magnets 114. As such, greater overlap between the structure braking elements 114 and trolley braking elements 112 can generate a higher braking force. Additionally or alternatively, a closer proximity or shorter distance between the structure braking elements 114 and trolley braking elements 112 can also generate a higher braking force. Through the mechanical linkage 109, the amount of force F applied by the load at least partially controls the distance or overlap between the conductor 112 and magnets 114, thereby causing the braking force to vary with the applied load force F. Higher braking forces are created for higher load forces F, since the conductor 112 is disposed farther into the magnetic field generated by the magnets 114. Additionally, the magnets 114 may be sized and/or spaced as required or desired to further increase braking force. Larger magnets 114 may generate a stronger magnetic field, so as to exert a greater force against the conductor 112 (and, therefore, a greater braking force against the trolley 102). Additionally, disposing the magnets 114 closer to each other (e.g., in the array 118) also exerts a greater force against the conductor 112, so as to further slow the trolley 102. In that regard, the plurality of magnets 114 disposed along the conveyance structure 104 may be spaced such that a smaller number of magnets 114 per linear foot of structure 104 are disposed proximate a first end 120 of the structure 104, while a greater number of magnets 114 per linear foot of structure 104 are disposed proximate a second end 122 of the structure 104. As such, the density of magnets 114 increases from the first end 120 to the second end 122. This can help increase braking force as the trolley 102 approaches the second end 122, so as to avoid collision thereof with a, e.g., support column 124. With these broad concepts in mind, examples of trolleys, conveyance structures, and braking systems, are described in the following figures.

Figure 2A:
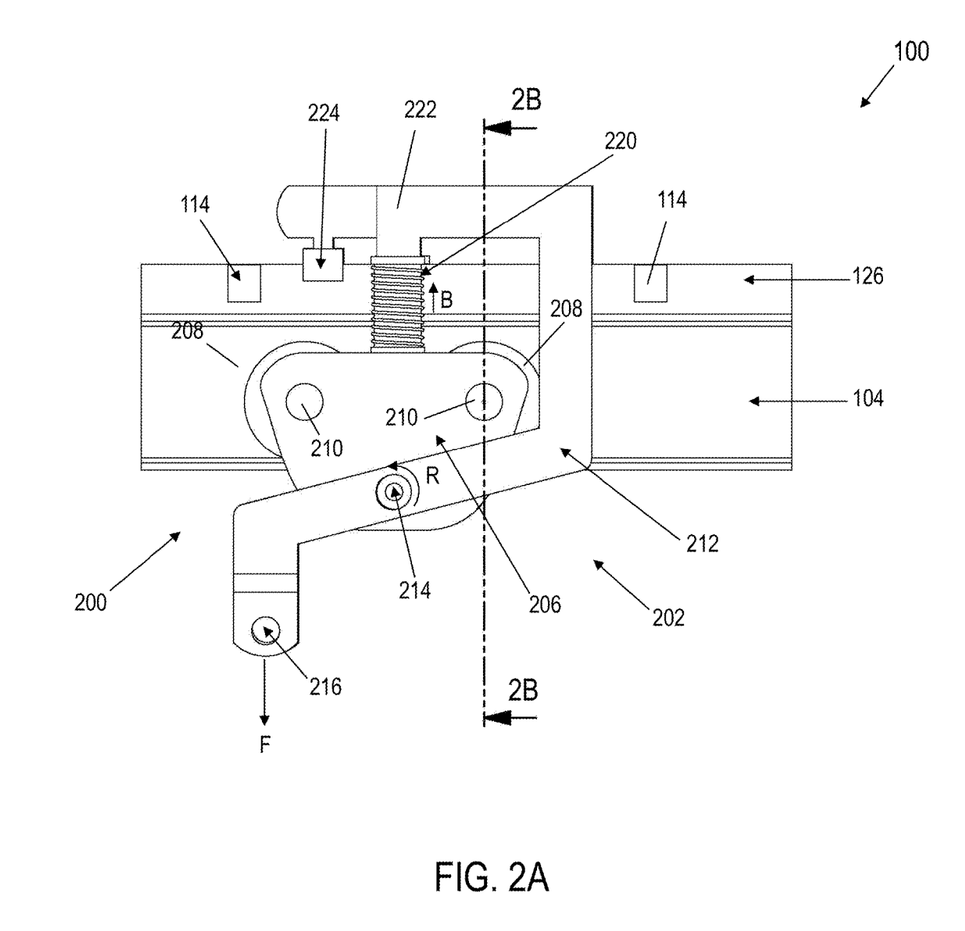
FIGS. 2A and 2B depict enlarged side and end views, respectively, of the eddy current braking system of FIG. 1.
Figure 2B:
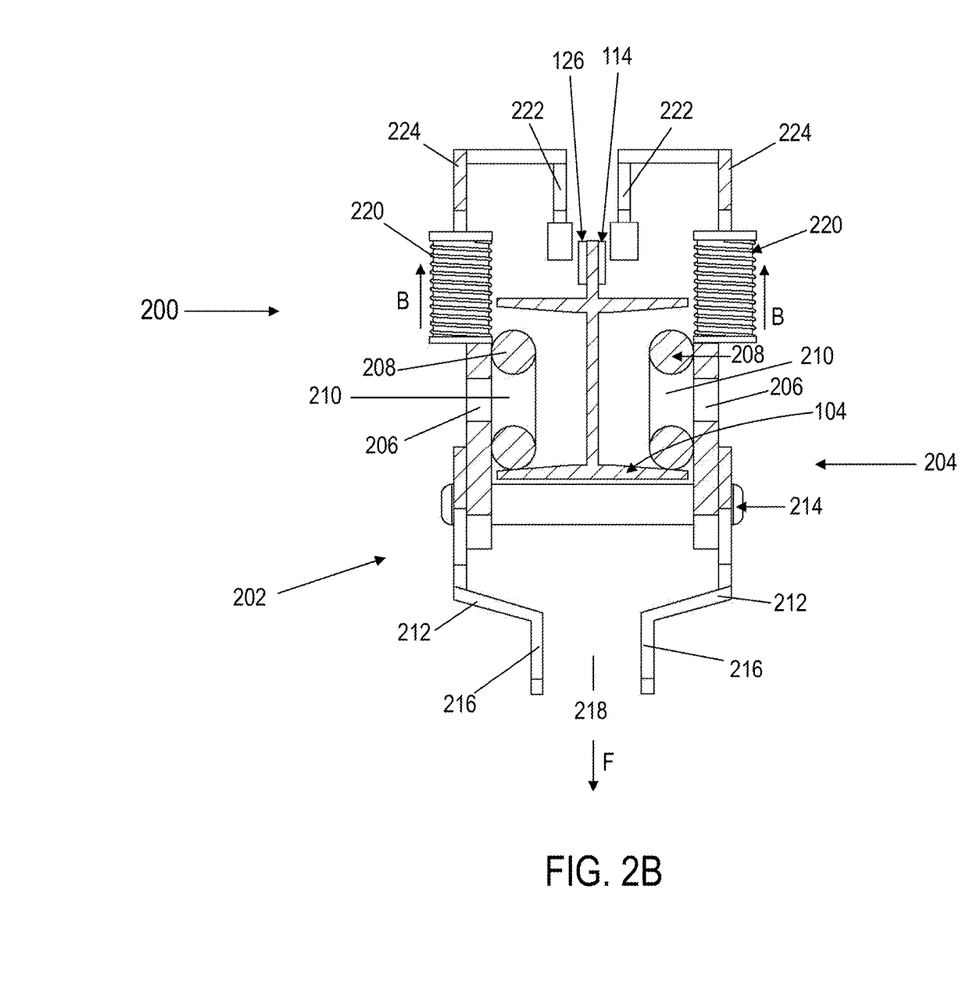

FIGS. 2A and 2B depict enlarged side and end views, respectively, of the trolley 200 of the eddy current braking system 100 of FIG. 1. The trolley 200 rolls along a rail conveyance structure 104 having a plurality of magnets 114 disposed on a magnet support structure 126 thereon. The trolley 200 includes a first truck 202 disposed on a first side of the rail 104 and a second truck 204 disposed on a second, opposite side of the rail 104 (as depicted in FIG. 2B). The first truck 202 and the second truck 204 are substantially mirror images of each other, and contain substantially the same components, so as to balance the loads applied by a force F. In the following description, the various components of the trolley are identified for both the first truck 202 and the second truck 204 and are generally not distinguished from each other unless otherwise noted. Trolleys 200 having first trucks 202 and second trucks 204 that are not mirror images of each other are also contemplated. For example, a single biasing element (described below) may be used for both tracks 202, 204.

Each truck 202, 204 includes a frame 206 to which one or more rollers or wheels 208 are rotatably connected at axles 210. A mechanical linkage in the form of a lever arm 212 extends from the frame 206. In the depicted example, the lever arm 212 is pivotably connected to the frame 206 at a pivot arm or axle 214 that may also be joined to the frame 206 of the second truck 204. The pivot arm or axle 214 is disposed at a midpoint of, and offset from, a line separating the two roller axles 210. The lever arm 212 may have any number of configurations and includes a load point 216, which can be an opening, a hook, or other implement to allow securing of a load that applies a force F to the lever arm 212. Here, the load point 216 is proximate one end of the lever arm 212. The load point 216 in the depicted example includes a bar 218 that joins the two lever arms 212 of the two trucks 202, 204 together and from which force F may be applied. When unloaded by force F, a biasing element 220, such as a compression spring, biases B the lever arm 212 into a first position, where an upper portion 222 of the lever arm 212 is biased away from the frame 206. In examples, the biasing element 220 may also be an appropriately-positioned extension spring, or a torsion spring (e.g., disposed about the pivot arm 214). Application of the force F causes a rotation R about the pivot arm 214 as depicted. This rotation R acts against the biasing force B, thus driving the lever arm 212 towards a second position, where the upper portion 222 of the lever arm 212 is closer to the frame 206. A conductor 224 is disposed proximate an end of the lever arm 212. When the trolley 200 is unloaded, the conductor 224 is in the first position. As the load force F is applied to the load point 216, rotation R of the lever arm 212 moves the conductor 224 closer to the magnets 114 disposed on the magnet support structure 126. As the conductor 224 is moved closer to the magnets 114, braking forces applied to the trolley 200 increase due to the proximity of the overlap of the magnet field generated by the magnets 114 and the conductor 224.

Figure 3:
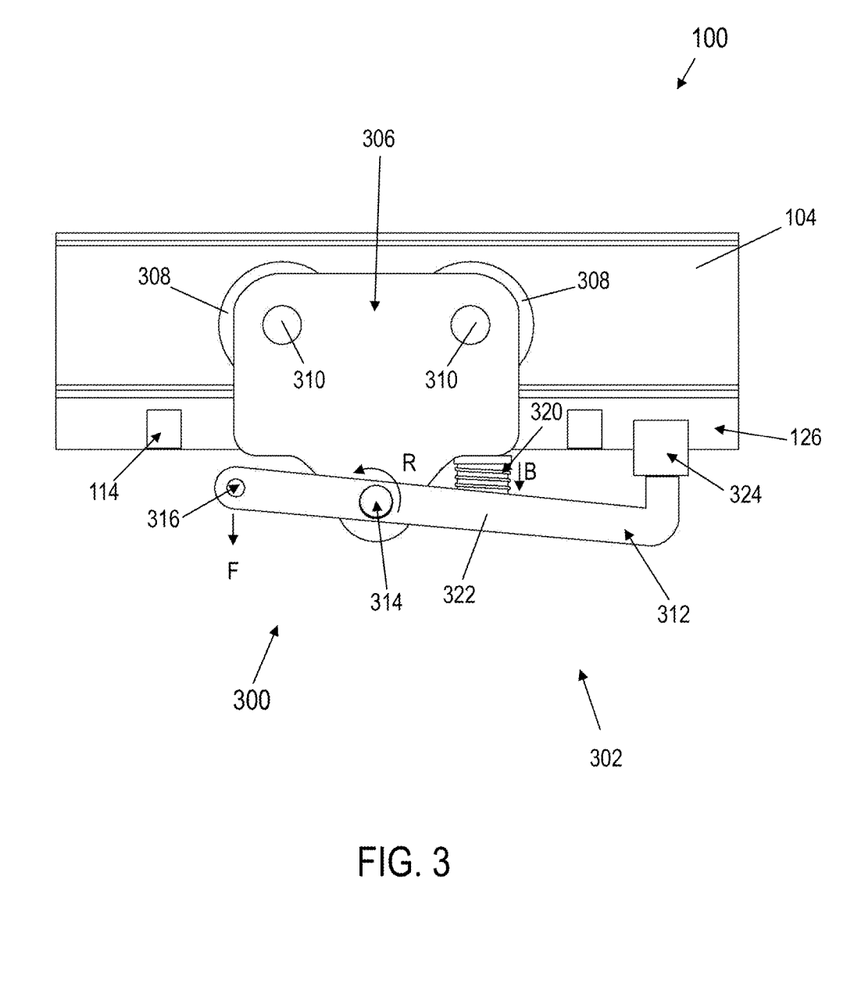
FIG. 3 depicts a side view of another example of a trolley for an eddy current braking system.

FIG. 3 depicts a side view of another example of a trolley 300 for an eddy current braking system 100. The trolley 300 rolls along a rail conveyance structure 104 having a plurality of magnets 114 disposed on a magnet support structure 126 thereon. The trolley 300 includes a first truck 302 disposed on a first side of the rail 104 and a second truck disposed on a second, opposite side of the rail 104. The second truck is not depicted, but is a substantially mirror image of the first truck 302. Each truck contains substantially the same components, so as to balance the loads applied by a force F. Trolleys 300 having first trucks 302 and second trucks that are not mirror images of each other are also contemplated.

Each truck 302 includes a frame 306 to which one or more rollers or wheels 308 are rotatably connected at axles 310. A mechanical linkage in the form of a lever arm 312 extends from the frame 306. In the depicted example, the lever arm 312 is pivotably connected to the frame 306 at a pivot arm or axle 314 that may also be joined to the frame of the second truck. The lever arm 312 includes a load point 316, which can be an opening, a hook, or other implement to allow securing of a load that applies a force F to the lever arm 312. The load point 316 is proximate one end of the lever arm 312. As in the example depicted in FIGS. 2A and 2B, the load point 316 may join the lever arm 312 of the first truck 302 to that of the second truck. When unloaded by force F, a biasing element 320, such as a compression spring, biases B the lever arm 312 into a first position, where a central portion 322 of the lever arm 312 is biased away from the frame 306. In other examples, extension or torsion springs may be utilized. Application of the force F causes a rotation R about the pivot arm 314 as depicted. This rotation R acts against the biasing force B, thus driving the lever arm 312 towards a second position, where the central portion 322 of the lever arm 312 is closer to the frame 306. A conductor 324 is disposed proximate an end of the lever arm 312. When the trolley 300 is unloaded, the conductor 324 is in the first position. As the load force F is applied to the load point 316, rotation R of the lever arm 312 moves the conductor 324 closer to the magnets 114 disposed on the magnet support structure 126. As the conductor 324 is moved closer to the magnets 114, braking forces applied to the trolley 300 increase due to the proximity of the conductor 324 to the magnets 114.

Figure 4:
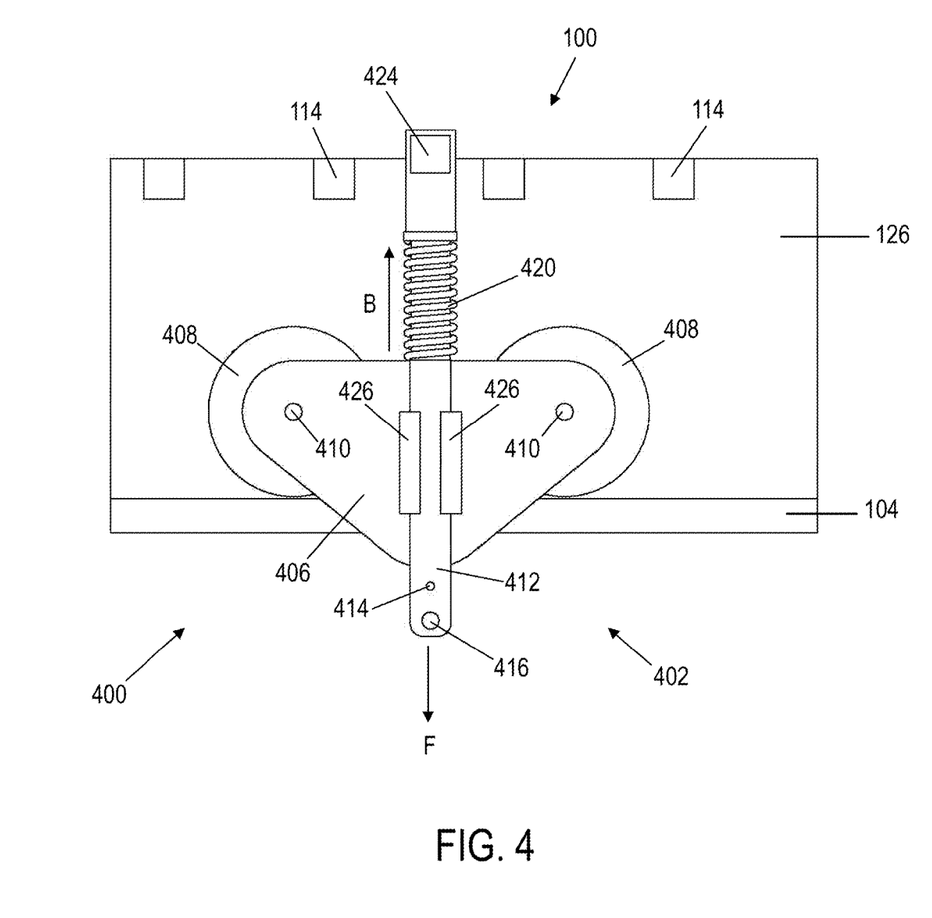
FIG. 4 depicts a side view of another example of a trolley for an eddy current braking system.

FIG. 4 depicts a side view of another example of a trolley 400 for an eddy current braking system 100. The trolley 400 rolls along a rail conveyance structure 104 having a plurality of magnets 114 disposed on a magnet support structure 126. The trolley 400 includes a first truck 402 disposed on a first side of the rail 104 and a second truck disposed on a second, opposite side of the rail 104. The second truck is not depicted, but is a substantially mirror image of the first truck 402. Each truck contains substantially the same components, so as to balance the loads applied by a force F. Trolleys 400 having first trucks 402 and second trucks that are not mirror images of each other are also contemplated.

Each truck 402 includes a frame 406 to which one or more rollers 408 are rotatably connected at axles 410. An arm 412 is slidably engaged with the frame 406. In the depicted example, the arm 412 slides within a channel 426 formed by the frame 406. A link or pin 414 may be used to connect the arm 412 to an arm of the second truck. Alternatively or additionally, the frames 406 of both trucks may be connected. The arm 412 includes a load point 416, which can be an opening, a hook, or other implement to allow securing of a load that applies a force F to the arm 412. The load point 416 is proximate one end of the arm 412 and may join the arm 412 of the first truck 402 to that of the second truck. When unloaded by force F, a biasing element 420, such as a compression spring, biases B the arm 412 into a first position, where the arm 412 is in a maximum upward position. In other examples, an appropriately-placed extension spring may be utilized. The biasing element 420 is engaged with the frame 406. Application of the force F opposes the biasing force B, thus driving the arm 412 towards a second position, where the link or pin 414 of the arm 412 is farther from the frame 406. A conductor 424 is disposed proximate an upper end of the arm 412. When the trolley 400 is unloaded, the conductor 424 is in the first position. As the load force F is applied to the load point 416, the arm 412 moves the conductor 424 closer to the magnets 114 disposed on the magnet support structure 126. As the conductor 424 is moved closer to the magnets 114, braking forces applied to the trolley 400 increase due to the proximity of the conductor 424 to the magnets 114.

Figure 5:
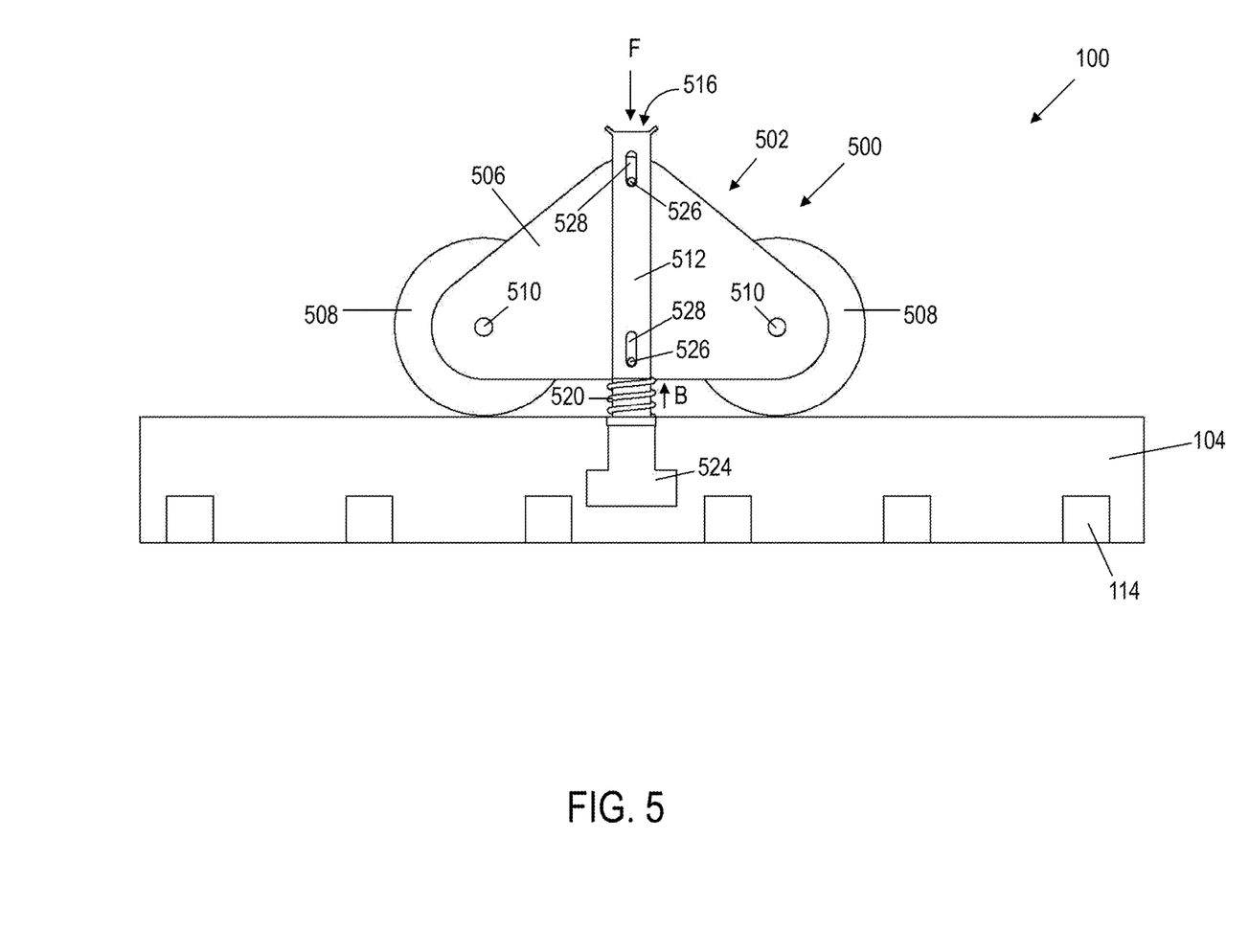
FIG. 5 depicts a side view of another example of a trolley for an eddy current braking system.

FIG. 5 depicts a side view of another example of a trolley for an eddy current braking system 100. The trolley 500 rolls along an upper surface of a rail conveyance structure 104 having a plurality of magnets 114 disposed thereon. The trolley 500 includes a single truck 502 in this example. A second truck, which may be a substantially mirror image of the truck 502, may be disposed on a second rail, which may be spaced from a first rail (e.g., as a roller coaster or rail track). Each truck may contain substantially the same components, so as to balance the loads applied by a force F. Trolleys 500 having trucks 502 that are not mirror images of each other are also contemplated.

The truck 502 includes a frame 506 to which one or more rollers 508 are rotatably connected at axles 510. An arm 512 is slidably engaged with the frame 506. In the depicted example, the frame 506 includes a number of pins 526 projecting therefrom. The pins engage with channels or slots 528 so as to guide a sliding movement of the arm 512. The arm 512 includes a load point 516 at one end thereof. In an example, the load point 516 may be connected to a roller coaster car, a train car, a mining cart, or other structure. The weight of the structure (as well as any occupants or materials disposed therein) applies a force F to the arm 512. When unloaded by force F, a biasing element 520, such as an extension spring, biases B the arm 512 into a first position, where the arm 512 is in a maximum upward position. Other types of spring configurations and placements may be utilized. The biasing element 520 is engaged with the frame 506. Application of the force F opposes the biasing force B, thus driving the arm 512 towards a second position. A conductor 524 is disposed proximate a lower end of the arm 512. When the trolley 500 is unloaded, the conductor 524 is in the first position. As the load force F is applied to the load point 516, the arm 512 moves the conductor 524 closer to the magnets 114 disposed on rail conveyance structure 104. As the conductor 524 is moved closer to the magnets 114, braking forces applied to the trolley 500 increase due to the proximity of the conductor 524 to the magnets 114.

Figure 6:
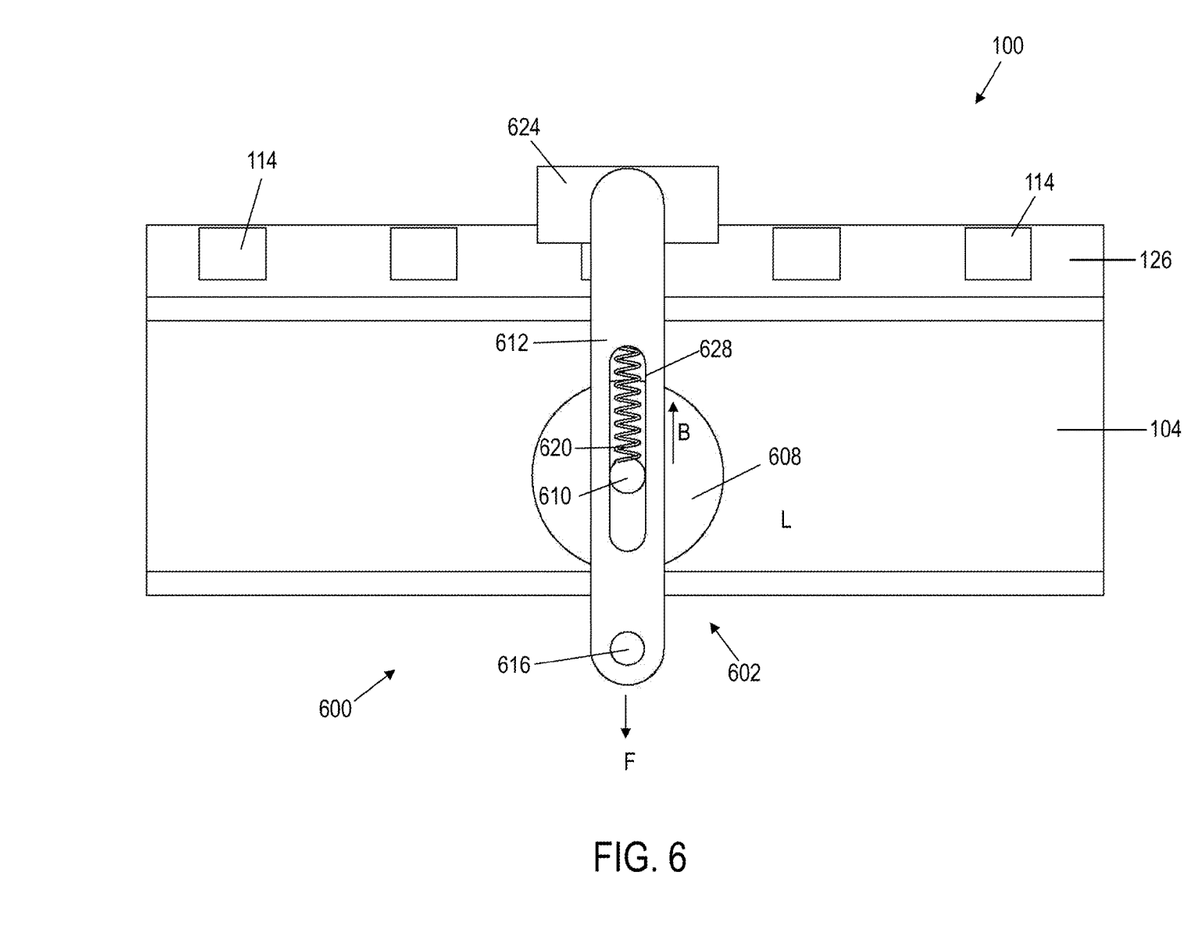
FIG. 6 depicts a side view of another example of a trolley for an eddy current braking system.

FIG. 6 depicts a side view of another example of a trolley 600 for an eddy current braking system 100. The trolley 600 rolls along a rail conveyance structure 104 having a plurality of magnets 114 disposed on a magnet support structure 126. The trolley 600 includes a first truck 602 disposed on a first side of the rail 104 and a second truck disposed on a second, opposite side of the rail 104. The second truck is not depicted, but is a substantially mirror image of the first truck 602. Each truck contains substantially the same components, so as to balance the loads applied by a force F. Trolleys 600 having first trucks 602 and second trucks that are not mirror images of each other are also contemplated.

Each truck 602 includes a single roller 608 that rotates about an axle 610. An arm 612 is slidably engaged with the axle 610. In that regard, the arm 612 also functions as the frame of the trolley 602. In the depicted example, the arm 612 defines a slot 628 that is guided by the axle 610. The arm 612 includes a load point 616, which can be an opening, a hook, or other implement to allow securing of a load that applies a force F to the arm 612. The load point 616 is proximate one end of the arm 612 and may join the arm 612 of the first truck 602 to that of the second truck. When unloaded by force F, a biasing element 620, such as a compression spring, biases B the arm 612 into a first position, where the arm 612 is in a maximum upward position. In other examples, an appropriately-placed extension spring may be utilized. The biasing element 620 is engaged between the arm 612 and the axle 610. Application of the force F opposes the biasing force B, thus driving the arm 612 towards a second position, where the biasing element 620 is more compressed. A conductor 624 is disposed proximate an upper end of the arm 612. When the trolley 600 is unloaded, the conductor 624 is in the first position. As the load force F is applied to the load point 616, the arm 612 moves the conductor 624 closer to the magnets 114 disposed on the magnet support structure 126. As the conductor 624 is moved closer to the magnets 114, braking forces applied to the trolley 600 increase due to the proximity of the conductor 624 to the magnets 114.

In the above examples, the biasing elements may include compression springs, torsion springs, extension springs, gas cylinders, electromagnetic devices, and so on. Additionally, biasing forces provided by the biasing elements in the various examples may be adjustable. In that regard, a user could further tune the biasing force B for a particular device based at least in part on a weight of the user, a desired fall rate, and other factors. Additionally, although basic geometric shapes of magnets and conductors (e.g., squares, triangles) are depicted, these elements may be any shape as required or desired for a particular application. Magnets and conductors may be milled or shaped. Additionally, either or both of the magnets and conductors can be filled non-conductive materials, or non-conductive materials (e.g., a plastic) may have magnets or conductors imbedded therein. Such configurations can further increase the dynamic range of the systems described herein.

FIGS. 7A-10 depict examples of conveyance structures and braking elements disposed thereon. In general, the braking structures in the figures are arranged so as to vary a braking force formed by the braking elements from one end of the structure to the other. In examples, the braking elements generate a magnetic field and are arranged such that a density of the magnetic field varies along the structure.

Figure 7A:
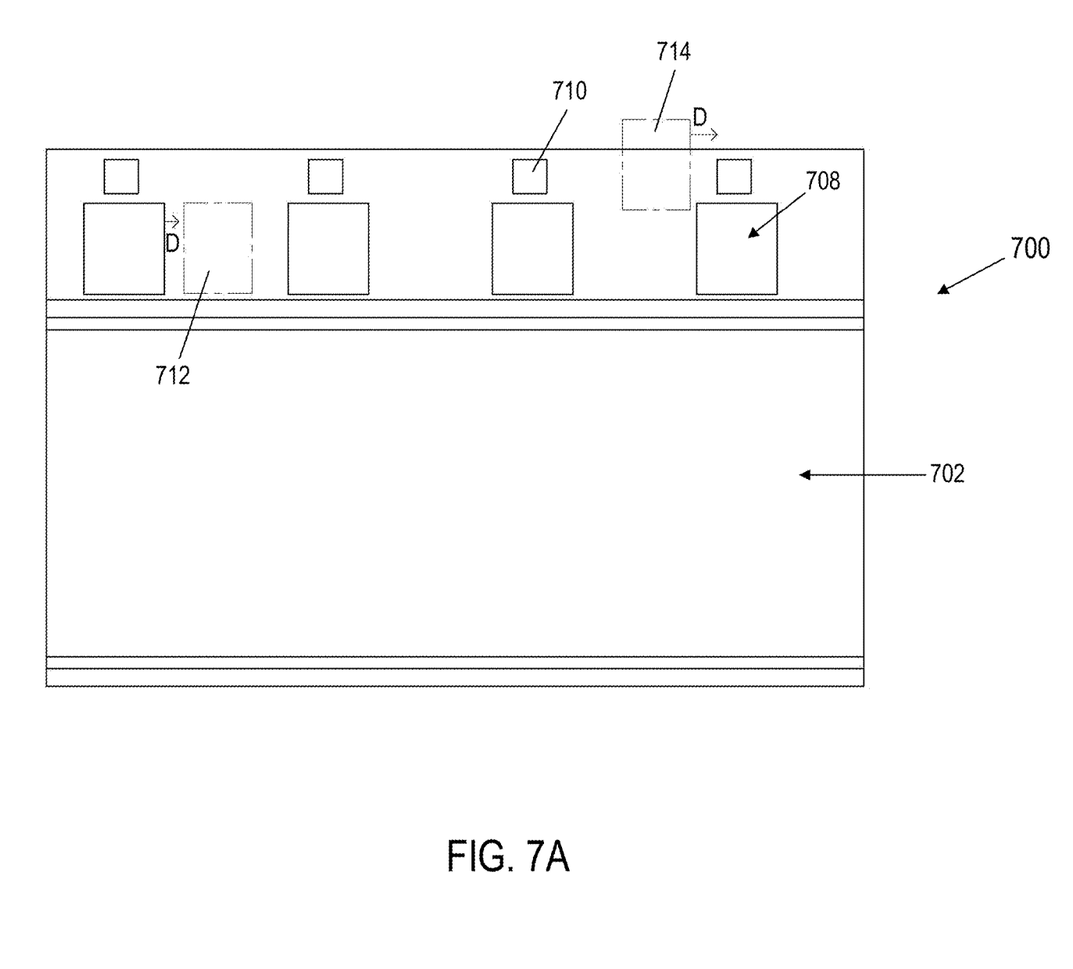
FIGS. 7A and 7B depict partial enlarged side and end views, respectively, of a conveyance structure for an eddy current braking system.
Figure 7B:
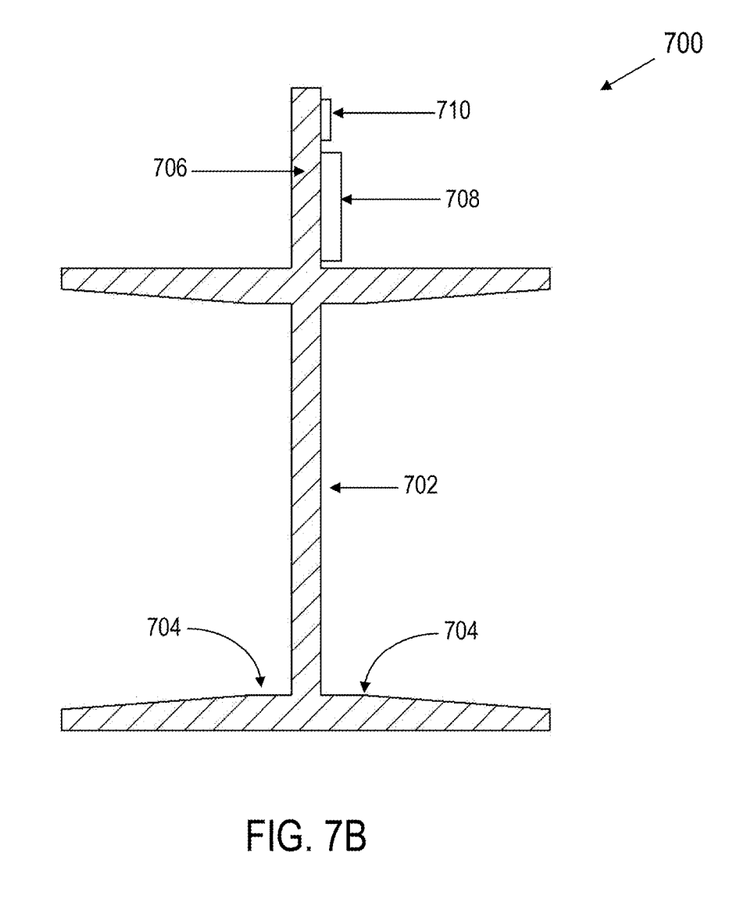

FIGS. 7A and 7B depict enlarged side and end views, respectively, of a conveyance structure 700 of the eddy current braking system 100 of FIG. 1, and are described simultaneously. The conveyance structure 700 includes a rail 702 that includes one or more surfaces 704. The surfaces 704 are configured to engage with the rollers or wheels of a trolley as described above. A magnet support structure 706 projects from an upper portion of the rail 702, but may also project from a lower portion of the rail 702, depending on the trolley and magnet configuration. Magnets 708, 710 are disposed on at least one side of the magnet support structure 706, but may be disposed on both sides in certain examples. The magnets 708, 710 may be electromagnets or permanent magnets. In the depicted example, the magnets 708, 710 are disposed in pairs, one generally disposed above the other. When a heavier load force is acting upon a trolley (e.g., as described above), the conductor (depicted as dashed box 712 in FIG. 7A) will be disposed closer to the larger magnet 708, which displays a relatively stronger magnetic force and, therefore, has a stronger braking force for the trolley as it travels in the direction D. When a lighter load force is acting upon a trolley (e.g., as described above), the conductor (depicted as dashed box 714) will be disposed closer to the smaller magnet 710 disposed near an upper portion of the rail 702, which displays a relatively weaker magnetic force and, therefore, has a weaker braking force for the trolley as it travels in the direction D. As such, trolleys bearing heavier loads are braked more aggressively than those bearing lighter loads. Additionally, although magnets of different sizes are depicted, the smaller magnet 710 may instead be a magnet that generates a weaker magnetic field relative to the larger magnet 708. As such, lighter loads will encounter the weaker magnetic field 710, while heavier loads will encounter the field from the stronger magnet 708, which is disposed proximate a lower portion of the rail 702. As such, dynamic range of the system may be increased.

Figure 8:
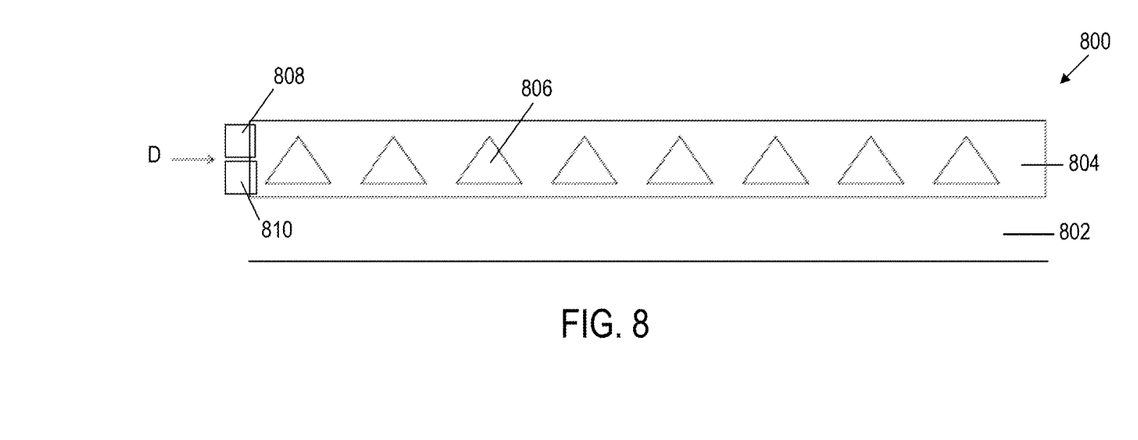
FIG. 8 depicts a partial side view of an example of a conveyance structure for an eddy current braking system.

FIG. 8 depicts an example of a partial side view of a conveyance structure 800 for an eddy current braking system. Much like the example of FIGS. 7A and 7B, the conveyance structure 800 includes a rail 802 and magnet support structure 804 projecting from a portion thereof, depending on the trolley and magnet configuration. A plurality of magnets 806 are disposed on at least one side of the magnet support structure 804. Dashed box 808 depicts a location of a conductor of a trolley under a light load as it travels in a direction D. In this position, the conductor 808 passes proximate a smaller area of the magnets 806 during travel. As such, a lighter braking force will be applied to the trolley. Dashed box 810 depicts a location of a conductor of a trolley under a heavy load as it travels in a direction D. In this position, the conductor 810 passes proximate a larger area of the magnets 806 during travel. As such, a heavier braking force will be applied to the trolley. Other magnet configurations and shapes are contemplated.

Figure 9:
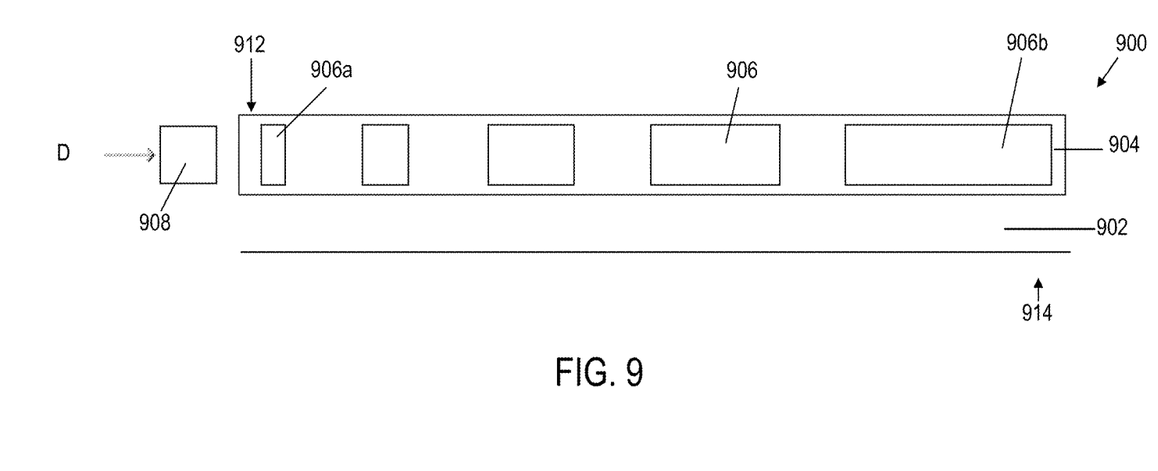
FIG. 9 depicts a partial side view of another example of a conveyance structure for an eddy current braking system.

FIG. 9 depicts another example of a partial side view of a conveyance structure 900 for an eddy current braking system. The conveyance structure 900 includes a rail 902 and magnet support structure 904 projecting from a portion thereof, depending on the trolley and magnet configuration. A plurality of magnets 906 are disposed on at least one side of the magnet support structure 904. Dashed box 908 depicts a location of conductor of a trolley under load as it travels in a direction D. Only a single conductor 908 is depicted in this figure for clarity. Of course, the vertical position of the conductor 908 may vary under different loads. As depicted, the magnets 906 extend from a top edge of the magnet support structure to a bottom edge thereof so as to ensure proximate with the conductor 908 regardless of a load on the trolley. As the trolley travels in the direction D, the conductor 908 encounters a first magnet 906a proximate a first end 912 of the conveyance structure 900. The first magnet 906a is a minimum size and will begin applying a brake force to the conductor 908 (and trolley). As the trolley continues in direction D, the conductor 908 passes larger and larger magnets 906, which further slow the trolley incrementally, based at least in part on the length or size of the magnets 906. A magnet 906b disposed proximate a second end 914 of the conveyance structure 900 is the largest and may be configured to ensure compete stoppage of the trolley. As such, in the conveyance structure 900 of FIG. 9, a size of the magnets per unit length of the conveyance structure 900 increases from the first end 912 to the second end 914, thus applying a larger and larger braking force to the conductor 908, so as to slow and stop the trolley.

Figure 10:
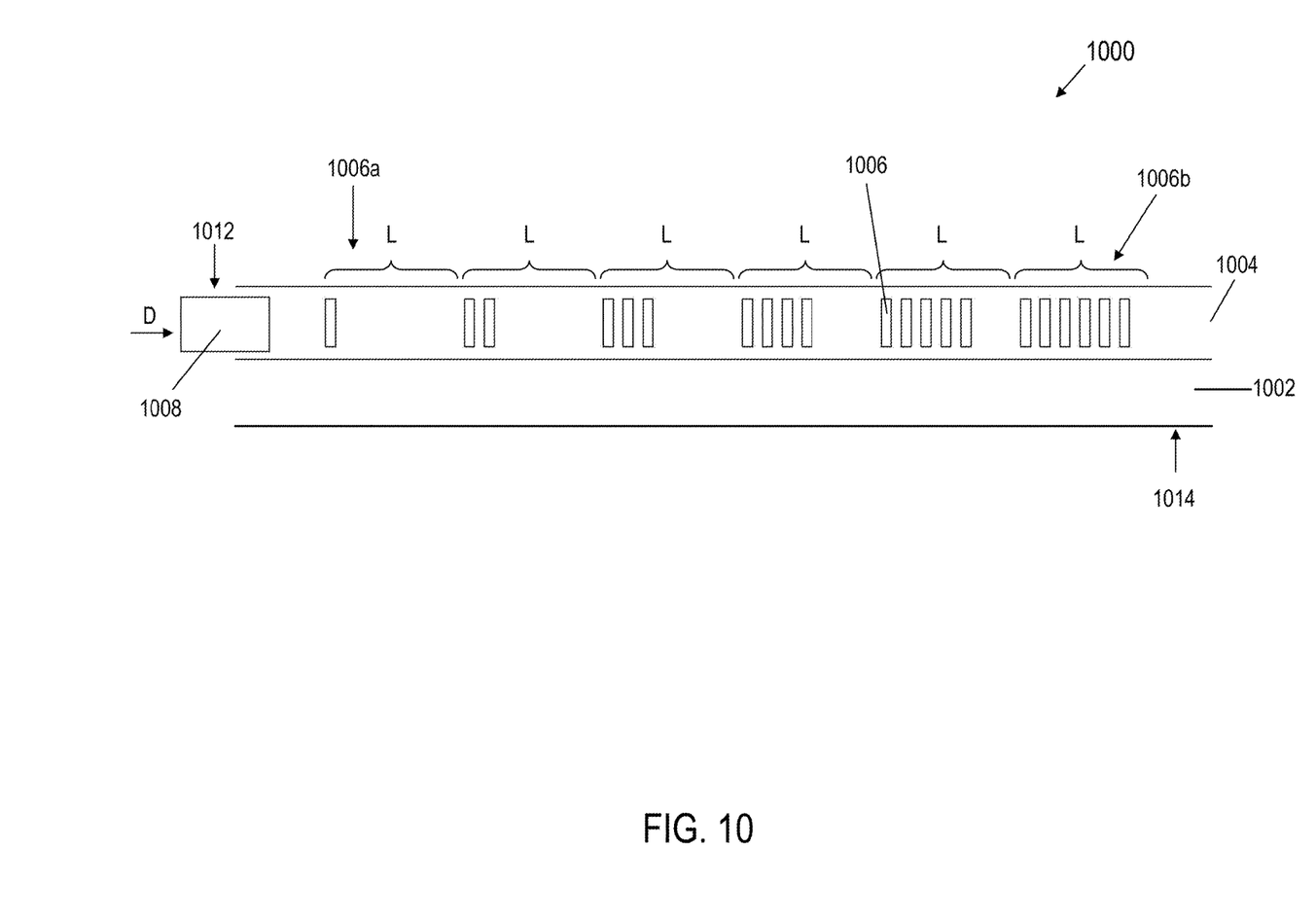
FIG. 10 depicts a partial side view of another example of a conveyance structure for an eddy current braking system.

FIG. 10 depicts another example of a partial side view of a conveyance structure 1000 for an eddy current braking system. The conveyance structure 1000 includes a rail 1002 and magnet support structure 1004 projecting from a portion thereof, depending on the trolley and magnet configuration. A plurality of magnets 1006 are disposed in banks on at least one side of the magnet support structure 1004. Each bank of magnets 1006 is defined by an equal unit length L of the conveyance structure 1000. Dashed box 1008 depicts a location of a conductor of a trolley under load as it travels in a direction D. Only a single conductor 1008 is depicted for clarity. As the trolley travels in the direction D, the material 1008 component encounters a first bank 1006a proximate a first end 1012 of the conveyance structure 1000. The first magnet bank 1006a is a minimum size and will begin applying a brake force to the conductor 1008 (and trolley). As the trolley continues in direction D, the conductor 1008 passes further banks of magnets 1006 of increasing density per unit length L of conveyance structure 1000. These magnet banks further slow the trolley incrementally, based at least in part on the density of the magnets 1006 per unit length L. A magnet bank 1006b disposed proximate a second end 1014 of the conveyance structure 1000 is the largest and may be configured to ensure compete stoppage of the trolley. As such, in the conveyance structure 1000 of FIG. 10, a density of the magnets per unit length L of conveyance structure 1000 increases from the first end 1012 to the second end 1014, thus applying a larger and larger braking force to the conductor 1008, so as to slow and stop the trolley.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods, devices, and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

This disclosure described some examples of the present technology with reference to the accompanying drawings, in which only some of the possible examples were shown. Other aspects may, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope and spirit of the present technology. Therefore, the specific structure, acts, or media are disclosed only as illustrative examples. The scope of the technology is defined by the following claims and any equivalents therein.

What is claimed is:

1. An apparatus comprising:
    a first truck including:
        a frame and at least one roller rotatably attached to the frame;
        a lever arm pivotably connected to the frame, wherein the lever arm includes a load point and at least one of a magnet and a non-ferrous conductive material; and
        a biasing element for biasing the lever arm into a first angular position, wherein a load applied to the load point drives the lever arm against a biasing force of the biasing element, and towards a second angular position, wherein the biasing element includes a compression spring disposed between the frame and the lever arm.

2. The apparatus of claim 1, further comprising an axle connecting the lever arm to the frame, wherein the at least one roller is rotatably disposed around the axle.

3. The apparatus of claim 1, further comprising an axle connecting the lever arm to the frame, wherein the biasing element includes a torsion spring disposed about the axle.

4. The apparatus of claim 1, further comprising an axle connecting the lever arm to the frame, and wherein the at least one roller includes two rollers separated by a line, and wherein the axle is disposed substantially at a midpoint of, and offset from, the line.

5. The apparatus of claim 1, wherein the lever arm includes a first end and a second end, and wherein the at least one of the magnet and the non-ferrous material is disposed proximate the first end.

6. The apparatus of claim 5, wherein the load point is disposed proximate the second end.

7. The apparatus of claim 1, further comprising:
    a second truck including:
        a frame and at least one roller rotatably attached to the frame;
        a lever arm pivotably connected to the frame, wherein the lever arm includes a load point and at least one of a magnet and a non-ferrous conductive material; and
        a biasing element for biasing the lever arm into a first angular position, wherein a load applied to the load point drives the lever arm against a biasing force of the biasing element, and towards a second angular position, and wherein the second truck is substantially a mirror image of the first truck and wherein the first truck is connected to the second truck proximate the load points of the first truck and the second truck.

8. The apparatus of claim 7, wherein the biasing element of the first truck and the biasing element of the second truck are a single biasing element.

9. The apparatus of claim 1, wherein the biasing force produced by the biasing element is adjustable.

10. An apparatus comprising:
    a first truck including:
        a frame;
        at least one roller rotatably connected to the frame;
        at least one of a magnet and a non-ferrous conductive material movably displaceable from a first position relative to the truck to a second positon relative to the truck, wherein the at least one of the magnet and the non-ferrous conductive material is movable towards the second position based on an application of a load; and
        a biasing element for biasing the at least one of the magnet and the non-ferrous conductive material towards the first position.

11. The apparatus of claim 10, further comprising an arm engaged with the frame, wherein the at least one of the magnet and the non-ferrous conductive material is connected to the arm, and wherein the biasing element is engaged with both the frame and the arm, and wherein the load is applied to the arm.

12. The apparatus of claim 11, wherein the arm is slidably engaged with the frame.

13. The apparatus of claim 12, wherein the at least one roller is rotatably connected to the frame with an axle, and wherein the axle at least partially guides sliding of the arm.

14. The apparatus of claim 11, wherein the biasing element includes at least one of a compression spring and an extension spring.

15. The apparatus of claim 11, wherein the at least one roller includes two rollers, and wherein the arm is disposed substantially between the rollers.

16. The apparatus of claim 11, further comprising:
    a second truck including:
        a frame;
        at least one roller rotatably connected to the frame;

at least one of a magnet and a non-ferrous conductive material movably displaceable from a first position relative to the truck to a second positon relative to the truck, wherein the at least one of the magnet and the non-ferrous conductive material is movable towards the second position based on an application of a load;

a biasing element for biasing the at least one of the magnet and the non-ferrous conductive material towards the first position; and an arm engaged with the frame, wherein the at least one of the magnet and the non-ferrous material is connected to the arm, and wherein the biasing element is engaged with both the frame and the arm, and wherein the load is applied to the arm, and wherein the second truck is substantially a mirror image of the first truck and wherein the first truck is connected to the second truck via the arms of the first truck and the second truck.

17. The apparatus of claim 10, wherein the biasing force produced by the biasing element is adjustable.

18. A system comprising:

a conveyance structure including a first end and a second end;

a plurality of braking elements configured to generate a magnetic field, wherein the plurality of braking elements are disposed along the conveyance structure between the first end and the second end, wherein the plurality of braking elements are arranged so as to vary a braking force formed by the plurality of braking elements between the first end and the second end, and wherein the plurality of braking elements are arranged such that a density of the magnetic field varies from the first and the second end; and a truck movably engaged with the conveyance structure.

19. The system of claim 18, wherein the plurality of braking elements are arranged such that a density of the plurality of braking elements per unit length of conveyance structure increases from the first end to the second end.

20. The system of claim 18, wherein the plurality of braking elements are arranged such that the plurality of the braking elements increase in size from the first end to the second end.

21. The system of claim 18, wherein the conveyance structure comprises an upper surface and a lower surface, and wherein the plurality of braking elements generate a weaker magnetic field proximate the upper surface and a stronger magnetic field proximate the lower surface.

22. The system of claim 21, wherein the weaker magnetic field is generated by a magnet having a first area and the stronger magnetic field is generated by a magnet having a second area larger than the first area.

* * * * *